United States Patent

Singer et al.

[11] Patent Number: 5,569,417
[45] Date of Patent: Oct. 29, 1996

[54] THERMOPLASTIC COMPOSITIONS COMPRISING FILLED, B-STAGED PITCH

[75] Inventors: Leonard S. Singer, Berea; David T. Orient, Medina, both of Ohio

[73] Assignee: Amoco Corporation, Chicago, Ill.

[21] Appl. No.: 386,803

[22] Filed: Jul. 27, 1989

Related U.S. Application Data

[63] Continuation of Ser. No. 141,219, Jan. 6, 1988, abandoned, which is a continuation-in-part of Ser. No. 40,301, Apr. 20, 1987, abandoned, which is a continuation-in-part of Ser. No. 755,775, Jul. 11, 1985, abandoned.

[51] Int. Cl.$^6$ .................................................. C01B 31/00
[52] U.S. Cl. .................. 264/29.1; 264/29.2; 264/29.4; 264/29.5; 264/29.6; 423/447.4; 428/408
[58] Field of Search ................... 264/29.1, 29.4, 264/29.5, 29.6, 29.2; 423/447.4; 428/408, 552

[56] References Cited

U.S. PATENT DOCUMENTS 3,943,213  3/1976  Wittaker et al. .................. 264/29

4,193,252  3/1980  Shepherd et al. .................. 57/351

FOREIGN PATENT DOCUMENTS 2714364  10/1979  Germany .

OTHER PUBLICATIONS

Delmonte, *Tech of Carbon+Graphite Fiber Composites*, N.Y., 1982, pp. 397–421.
Kelly et al, *Handbook of Composites*, vol. 4, Holland, pp. 109–174.
Mesophase Graphite, *Great Lakes Research Corp.*, Apr. 1, 1971–Mar. 1, 1972.

*Primary Examiner*—Peter A. Nelson
*Attorney, Agent, or Firm*—Richard J. Schlott; Stephen L. Hensley

[57] ABSTRACT

Filled thermoplastic pitch comprising particulate filler and advanced mesophase pitch having a TMA deformation temperature of at least 400° C., and a method for the manufacture thereof. The filled thermoplastic pitch may be shaped and densified in one or more thermoforming operations. The resulting preform may be thermoset and carbonized in ordinary baking operations without requiring molds and pressurized vessels.

9 Claims, No Drawings

THERMOPLASTIC COMPOSITIONS COMPRISING FILLED, B-STAGED PITCH

CROSS REFERENCE TO RELATED APPLICATION

This application is a continuation of 141,219, filed Jan. 6, 1988 which is a CIP of Ser. No. 040,301, filed Apr. 20, 1987 which was a CIP of Ser. No. 755,775 filed Jul. 11, 1985, all now abandoned.

BACKGROUND OF THE INVENTION

This invention relates to carbon-carbon composites. More particularly, the invention relates to filled materials comprising particulate fillers and a pitch matrix which may be used in the production of carbon-carbon composites. Still more particularly, this invention relates to B-staged, thermoformable compositions comprising particulate fillers and a pitch matrix, and to a method for producing preforms and shaped articles from such compositions.

Carbon-carbon composites are well known and are widely used in many applications where good mechanical properties at extreme temperatures and pressures are needed. Generally, a carbon-carbon composite comprises a heterogeneous combination of carbonaceous reinforcing material such as carbon fibers, graphite fibers, carbon particles or the like, dispersed in a carbon matrix.

Carbon-carbon composites may be made, for example, by carbonizing fabricated structures formed by impregnating a carbonaceous reinforcing material with pitch or an organic resin in liquid form.

The organic resins ordinarily used in impregnating processes are low molecular weight, soluble, often liquid resins or resin precursors known in the art as A-stage thermosetting resins, and may include, for example, epoxy resins, phenolic resins, a variety of curable acrylic resins, urea formaldehyde resins, and the like. Such resins will be advanced or further polymerized during or after the impregnation step to provide impregnated reinforcement in an incompletely cured or B-staged condition. The B-staged impregnated material or prepreg remains thermoplastic and may be laid up, wound or otherwise fabricated and further formed or shaped as desired before being finally cured into a thermoset composite article. The thermoset composite will then be carbonized or pyrolyzed in a heating step to decompose the matrix resin and form a shaped carbon-carbon composite article. The high temperatures used in the carbonizing process produce volatile, low molecular weight by-products that cause the formation of voids, blisters and other defects. Such defects may be minimized by carrying out the carbonizing step under pressure and in a mold.

Where the impregnating material is pitch, carbonizing the impregnated reinforcing material ordinarily requires the use of a mold or other container. Unlike the cured or thermoset organic resins, pitch melts, liquifies and flows on heating. A containment vessel is necessary to prevent loss of the pitch component during the carbonizing step, and may also be needed to constrain the pitch-impregnated reinforcing material to the desired shape. In addition, volatiles evolved during pitch carbonization often cause the molten pitch to foam, resulting in a porous, low density structure having voids and other defects. Prior art processes for manufacturing pitch-based composites have generally relied on applying substantial pressure during the carbonizing step, usually employing a mold or similar pressure vessel, to minimize such problems.

Typical processes for producing a carbon-carbon composite from organic resins or pitch and carbon fibers are discussed by J. Delmonte in "Technology of Carbon and Graphite Fiber Composites," Van Nostrand Reinhold Company, New York, 1981, Chapter 13.

U.S. Pat. No. 3,943,213 discloses dispersing from about 1 to about 10 weight percent of chopped carbon fibers (less than about one inch long) in a hot, fluid, pitch system, forming or casting a shaped article, and pyrolyzing and graphitizing the resulting article in its containment vessel. The patent, at Col. 2, lines 25–26, discloses carbonizing the composite at about 400° C. to 650° C., then graphitizing by conventional methods. Although the fibers can be mixed with the liquid pitch at or below the point at which mesophase is formed, the mixture is converted to mesophase pitch before casting the finished article, with or without applying external pressure, while the mesophase pitch is still liquid.

German Patent No. 2,714,364 relates to a process for producing a carbon-carbon composite by impregnating either chopped carbon fiber or a wound, continuous carbon fiber structure with a liquid pitch, converting the pitch to mesophase pitch, then carbonizing the mixture at a temperature of 400° C. to 1,000° C. while maintaining a mechanical pressure of 725 to 11,000 psi on the mixture during the carbonizing. The heat treatment is carried out under pressure to produce an infusible, densified body.

It will be apparent that the known processes for manufacturing pitch-based carbon-carbon composites do not lend themselves well to the production of complex shapes. Casting shaped articles requires the use of expensive molds and pressure equipment. Reducing foaming and void formation in composite castings is difficult, and additional impregnating and carbonizing post-treatments are frequently needed to fill voids and cracks and to increase the bulk density of the resulting composite article.

A thermoformable composition having the characteristics of a B-staged resin and comprising a thermoplastic pitch and a particulate filler would provide a substantial improvement in the carbon-carbon composite manufacturing art. Such a composition, in the form of sheet or rod or in a chopped or pelletized form, could be compression molded or hot-pressed by conventional methods to form a dense preform structure or article having the desired shape. The resulting preform could then be carbonized, with or without use of a containment vessel or mold, to provide carbon-carbon composites in shapes with otherwise difficult to attain complexity.

SUMMARY OF THE INVENTION

The invention relates to a thermoplastically-deformable composition comprising particulate filler and an advanced mesophase pitch having a thermal mechanical analysis (TMA) deformation temperature of at least about 400° C., and a process for the preparation of such compositions. The composition may be shaped and densified by hot-pressing or other means for applying pressure and heat to form a shaped, but still thermoplastically-deformable preform. The preform may be transformed into a shaped carbon-carbon composite article by heating, preferably in a substantially non-reactive atmosphere, to thermoset and carbonize the pitch.

BRIEF DESCRIPTION OF THE DRAWINGS

FIG. 1 is a flow diagram generally depicting the process for preparing the filled thermoplastic compositions and shaped articles of this invention.

FIG. 2 is a schematic representation of a process for producing the B-staged, filled pitch compositions of this invention in the form of either crushed thermoplastic or filled sheet.

FIG. 3 is a schematic representation of a shaping operation for producing a shaped preform by pressing filled thermoplastic sheet.

FIG. 4 is a schematic representation of a second alternative embodiment wherein a filled thermoplastic, compression-molded, cylindrical body is produced.

FIG. 5 is a diagrammatic drawing of an embodiment of the invention for producing a graphitized carbon-carbon composite in sheet form.

DETAILED DESCRIPTION OF THE INVENTION

The thermoplastic, carbon fiber reinforced pitch compositions of this invention comprise a filler dispersed in an advanced or B-staged mesophase pitch matrix.

The particulate fillers useful in the practice of the invention are inert particulate materials in pulverized form which are capable of withstanding carbonizing temperatures. Commonly available fillers derived from a hydrocarbon or coal tar sources include crushed or pulverized coke and coke flour, as well as powdered graphite and the like. Other fillers having the necessary thermal stability include ceramic powders, powdered silicon carbides, aluminas and the like.

The pitch matrix component of the compositions of this invention comprises an advanced or polymerized mesophase pitch. Mesophase pitch is an art-recognized term used to describe optically-anisotropic, insoluble material that results from heating isotropic pitch at a temperature in the range of about 350° to 500° C. Pitch having a high mesophase content may also be produced by extracting the more soluble components from an isotropic pitch. However, mesophase pitch produced using solvent extraction will generally have a softening point about 80° C. less than thermally produced mesophase pitch having the same mesophase content and contain a higher level of volatiles. Solvent-extracted mesophase pitches are therefore less preferred for the purposes of this invention. The characteristics of and methods for producing mesophase pitch are more fully described and set forth in U.S. Pat. No. 4,005,183, incorporated herein by reference, as well as U.S. Pat. Nos. 3,976,729, 4,032,430, 4,209,500 and 4,303,631.

Mesophase pitch ordinarily softens and becomes molten at temperatures well below 400° C. The pitch component useful in the practice of this invention is a further polymerized or advanced, resinous semi-solid formed from mesophase pitch in a process that in some respects resembles the transformation of an A-stage, liquid organic resin or resin precursor into a B-staged polymeric, resinous material. The degree of polymerization of the mesophase pitch component is advanced by heating at a temperature in the range of from about 350° to 500° C., preferably from about 380° to 450° C. until the pitch-based product is resinous and no longer liquid, and has a thermal mechanical analysis (TMA) deformation temperature of at least 400° C., preferably from about 400° to about 500° C. The particular TMA deformation temperature selected will depend in part upon the degree of thermoplastic character desired. Lower values correspond to readily-moldable compositions requiring a more carefully-selected heating schedule for the subsequent carbonizing steps. Higher TMA deformation temperature values correspond to resins which are more difficult to mold but are more readily and quickly converted to a thermoset infusible structure without loss in shape. Resins with TMA deformation temperatures much above about 470° C., and particularly above about 500° C., become difficult to densify and mold before becoming completely thermoset. TMA deformation temperature is an art-recognized characteristic of polymeric materials. Measurement of TMA deformation temperature is described in "Thermal Characterization of Polymeric Materials," W. W. Wendlandt and P. K. Gallagher, Academic Press, Inc., New York, 1981.

The thermoplastic, filled compositions may be formed by combining from about 6 to about 80, preferably from 25 to about 67 wt % particulate filler and, correspondingly from about 94 to about 20, preferably from 75 to about 33 wt % liquid, molten mesophase pitch in a mixing step, and then polymerizing the mesophase pitch by heating the impregnated reinforcement until the desired degree of advancement is attained. It is possible to use a liquid isotropic pitch, however the initial heat treatment of the mixture of filler and pitch will include the periods and temperatures appropriate to converting the isotropic pitch into mesophase pitch.

These heat treatments are preferably carried out in a non-reactive atmosphere to avoid oxidizing the pitch. Hot pitch reacts with available oxidizing gases such as oxygen, becoming oxidatively thermoset and no longer thermoplastically deformable. In the preparation of the thermoplastic compositions of this invention, any heating of the pitch, whether to melt it, to advance its TMA deformation temperature, or to shape it, will be carried out while excluding air, and preferably in an inert environment such as a vacuum or a substantially non-reactive, inert gas such as nitrogen or argon. Use of a vacuum purging operation to remove entrapped gases during the melting step will also be preferred.

The thermoplastic composition, after heat treatment to advance or B-stage the pitch component, may either be cooled and stored until needed for further processing, or immediately subjected to a shaping and densifying operation. The shaping step may, for example, be accomplished as a compression molding operation in which the thermoplastic composition is subjected to heat and pressure using a cavity mold to form the composition to the desired shape. The temperatures and times employed will be selected to accomplish the shaping operation while minimizing any further advancement of the mesophase pitch. Ordinarily, temperatures above, and generally of from about 40° to about 80° C. above, the TMA deformation temperature will be used. Since the TMA deformation temperature of the pitch typically increases at the rate of 0.5°/min. at 450° C. or 22°/min. at 550° C., it may be desirable to use a series of brief shaping operations, followed by quick cooling to minimize further advancement and to preclude the possibility of carbonizing the pitch and transforming the composition into a thermoset, rigid and intractable mass.

The shaping operation also serves to densify the thermoplastic composition by eliminating voids and porosity. The bulk density of the advanced pitch after the pressure shaping operation will lie in the range of from about 0.5 to about 1.3, and preferably from about 1.15 to about 1.3 g/cm$^3$. Most preferred are compositions in which the pitch has a bulk density equal to the density of void-free pitch, which for most pitches lies generally in the range of 1.29–1.36, or about 1.3 g/cm$^3$. The composition, after the compressing and shaping step, will comprise from 5 to about 60, preferably from 20 to about 60 and more preferably from 30 to 50% by volume of the particulate reinforcement, the balance being pitch with a density in the above range. The overall density of the filled composition will be in the range of from about 1.1 to about 1.8 g/cm³ after pressing, depending in part upon the filler content and the density of the filler employed.

The processes used for making and forming or shaping the thermoplastic compositions of this invention will be better understood by reference to the drawings. Turning now to FIG. 1 showing such a process generally as a series of steps in a flow scheme, particulate 11 and pitch 12 are combined in a mixing step 10. The mixing will be carried out at temperatures and under conditions that render the pitch molten, generally in the range of from 300° to 400° C. The mixture of pitch and filler is then subjected to a heat treatment 16 at a temperature in the range of from 350° to 500°, preferably 380°–450° C., to advance or polymerize the pitch to the desired TMA deformation temperature of at least 400° C. The time required, which will depend in part upon the temperatures employed, the size of the part and the particular pitch used, may be from as little as 10 min., using the higher temperatures and a partly advanced pitch, to 6 hr. or more when lower temperatures, large parts and/or highly-fluid pitches are used. The B-staged, thermoplastic composition 17 which may, if desired, be cooled and stored until needed, may be further processed in a shaping operation 18, using heat and mechanical pressure to shape and densify the material. The resulting thermoformable, shaped preform 19 has an overall density of from about 1.1 to about 1.8, and the advanced pitch component has a bulk density of from 0.5 to about 1.3 g/cm³.

Turning now to FIG. 2, an embodiment of the process is shown wherein particulate filler 11' such as for example calcined coke flour, and crushed or powdered pitch 12' are first thoroughly mixed as solids in mixing means 20. The mixed solids are then placed in vessel 22, which may conveniently take the form of a flat, shallow pan, as shown, and passed into an oven 25 or similar heating means having the capability of maintaining an inert gas environment. The pitch and filler mixture is then heated first to a temperature in the range of 300° to 400° C. to melt the pitch, then to a temperature in the range of 400° to 500° C. for a period sufficient to advance the resin to a TMA deformation temperature of at least 400° C. The B-staged, filled thermoplastic pitch 27 will then be cooled and separated from vessel 22 to provide B-staged filled thermoplastic in sheet form 28 which may be used directly in a subsequent shaping operation or crushed, providing powdered material 29 for use in a subsequent molding step.

The shaping and densifying operation, which may also be accomplished as part of a continuous process, will vary depending upon the form of the B-staged filled thermoplastic pitch. As shown in FIG. 3, B-staged filled thermoplastic sheet 28', which may be made by a batch process such as that of FIG. 2 or in a continuous process, may be cut to an appropriate size and hot pressed by being placed in a heated mold 35, rapidly heated under an inert atmosphere above the TMA deformation temperature, quickly pressed 36 and then cooled to provide a shaped preform 37. In the alternative embodiment of FIG. 4, the filled, B-staged thermoplastic pitch is employed in the form of a pulverized material 29'. Such materials may be prepared for example by pelletizing the filled pitch, or by chopping or crushing advanced, filled pitch sheet which may be prepared using the process described and shown as FIG. 2. The particulate material may be molded by being placed in a mold 35', preferably evacuated, and then hot pressed 36' in an inert environment to form a filled thermoplastic pitch cylindrical preform 37'.

It will be apparent that the filled thermoplastic pitch compositions of this invention may also be prepared and shaped in an integrated process such as, for example, by pultrusion, sheet extrusion and the like, and compressed or densified using alternate means for applying mechanical pressure such as by passing the heated, thermoplastic composition under rollers or through the nip of a two-roll mill or similar device.

In FIG. 5, there is shown schematically a process for producing a filled carbon-carbon composite in sheet form.

The heating operations are accomplished within an enclosed or shrouded area, indicated by dotted lines 54, equipped with heating means (not shown) and means for providing an inert gas atmosphere (not shown). A filled, B-staged, thermoplastic pitch in the form of sheet 28" is heated to soften the pitch component, then subjected to a shaping and densifying operation by further heating and moving the filled sheet 28" through means 55 for applying pressure in the form of a plurality of rollers 56 positioned to contact the surfaces of the sheet to densify and further shape the sheet. The shaped and densified filled thermoplastic sheet or preform 37" is then thermoset and carbonized by being passed through a high temperature section of the carbonizing furnace (not shown), providing a carbon-carbon composite sheet 59.

It will be understood that the process shown in FIG. 5 may be either a batch or continuous operation, and may be adapted to provide sheet structures of substantial length, or to have other cross-sections and profiles such as rectangular, oval, channel or the like, through use of appropriately-shaped rollers and dies.

The invention will be better understood by consideration of the following examples. These examples are provided to illustrate the principles of the invention and the practice thereof and are not intended to be limiting of the invention.

In the following examples, the densities of molded materials were determined by calculation from the weights and the measured dimensions of the articles. Densities were independently verified by immersion methods in several instances and found to correspond within ±0.05 g/cm³. The TMA deformation temperatures for composites were estimated from a time/TMA deformation temperature plot of data generated by heating a series of 50 g mesophase pitch samples at 450° C. under nitrogen for varying periods of time, then measuring the TMA deformation temperature for each sample. The TMA deformation temperature of the pitch before treatment was 215° C. Interpolation to accommodate other heating temperatures can be done by calculation from the 450° C. data.

Except for Control Example B, TMA deformation temperatures in the following Examples were measured using specimens made by compacting well-pulverized, powdered pitch. The compacts were placed in the sample holder with the probe at the surface of the sample. The values for the Control B specimens were determined on a compacts made from pitch that had not been previously pulverized, and having the thermocouple inserted into a prepared opening in the compact to assure better heat transfer. While the two methods of sample processing were reproducible, the powder compact method gave values of about 40° higher, due largely to oxidizing of the pitch during the pulverizing step.

Mesophase pitches used in the following examples were prepared by well-known methods. A typical mesophase pitch having a mesophase content of 70 wt. % (by optical methods) and a Mettler softening point of about 325° C. was prepared by heating and steam sparging at 400° C. a precursor petroleum pitch having a density of 1.233 g/cm³ a softening temperature of 120.5° C., and containing 0.83 percent by weight of quinoline insolubles (as measured by quinoline extraction at 75° C.). By elemental analysis, the precursor pitch was C=93.3%; H=5.6%; S=0.94%. The ash content was 0.044%.

EXAMPLE 1

Pitch-based carbon fiber was chopped to ¼ lengths, and 3 g of the chopped fiber was mixed with 7 g of powdered mesophase pitch. The mixture was compacted to form a 2¼ disc by pressing at room temperature, using a pressure of 8300 psi. The compacted mixture was heated under vacuum over a 1¾-hour period to 400° C., then under nitrogen at 2 atm. to 450° C. over ¾ hour and held for 7 ½ hours at temperature, and then cooled. The TMA deformation temperature of the material was estimated as 450°–470° C.

The cooled thermoplastic composite was broken into pieces, placed in a 2.43" diameter disc mold and heated under nitrogen to 525° C. The material was then hot pressed at 525° C. and 9500 psi, then cooled to provide a 2.43"×0.1" thermoplastic disc preform having a density of 1.33 g/cm$^3$.

Thermosetting the disc was accomplished by heating the disc under nitrogen at 552° C.

EXAMPLE 2

The procedure of Example 1 was substantially followed to prepare 2.4" discs from a mixture of calcined petroleum coke flour (55% of the particles being smaller than mesh) and mesophase pitch. The proportions of filler to pitch was 30/70. The resulting thermoplastic disc preform was 2.43"× 0.1" and had a density of 1.48 g/cm$^3$. The disc preform was thermoset at 552° C.

EXAMPLE 3

The procedure of Example 1 was substantially repeated using a 30/70 mixture of calcined petroleum coke particles and mesophase pitch. The particle size range was through mesh, on 35 mesh, corresponding to particle sizes of from 0.24 and 0.84 mm. The resulting disc preform had a thickness of 0.14 inches and a density of 1.46 g/cm$^3$. The disc was thermoset following the procedure of Example 1.

CONTROL EXAMPLE A

Mesophase pitch (50 g) was heated under nitrogen to 450° C. over a 4-hour period, then held at temperature an additional 6 hours. The TMA deformation temperatures of two samples were 446° and 448° C. The advanced or B-staged pitch was then powdered and placed in a 2¼ diameter disc mold. The mold was enclosed in tool-steel foil to exclude air, heated to 515° C. and pressed at 2000 psi. The 2¼ disc of densified, thermoplastic pitch, removed after cooling to room temperature, was approximately 0.1" thick and had a density of 1.31 g/cm$^3$.

The thermoplastic disc was then heated without a mold to 550° C. to thermoset the pitch. Various thermoset samples were successfully carbonized by heat treatments at temperatures of 1000, 2000° and 3000° C., giving minimum uniform densities of 1.6–2.0 g/cm$^3$ for materials treated at 3000°.

CONTROL EXAMPLE B

A mesophase pitch was heat treated at 450° C. for 5 hours to give an advanced mesophase pitch disc with a TMA deformation temperature of 435° C. A powdered sample of the advanced mesophase pitch was pressed at room temperature to form a cylindrical pellet 1.26" in diameter having 1" height. The pellet was placed in the 2¼ disc mold, heated under nitrogen at 11.2° C./min. to 470° C., then to 500° C. over an additional 5 minutes, and pressed at 500° C. using 8000 psi applied pressure. The disc, removed from the mold after cooling under pressure to room temperature, was thermoplastic and had a TMA deformation temperature of 455° C., demonstrating that the molding step of the process of this invention does not thermoset or coke the advanced mesophase pitch component. The TMA deformation temperatures of materials in this Control Example B were measured on compacted specimens prepared without pulverizing.

The invention will thus be seen to be a thermoplastic composition comprising an advanced or B-staged mesophase pitch and a particulate filler. The pitch component will have a TMA deformation temperature of at least 400° C. The overall composition will have a density of from 1.1g to about 1.8 g/cm$^3$, and comprise from 5% to about 60% by volume filler and, correspondingly, from 95% to about 40% by volume advanced mesophase pitch having a density of from 0.5 to about 1.3 g/cm$^3$. The compositions are prepared by a process comprising the steps of combining and mixing the filler and pitch, heating to render the pitch molten and liquid, advancing the pitch by a heat treatment to a TMA deformation temperature of at least 400° C., and shaping and densifying the composition by applying pressure at a temperature above the TMA deformation temperature.

The compositions of this invention are particularly useful in the production of carbon-carbon composites. Further modifications and adaptations of the composition and process of this invention beyond the particular illustrative examples and specific embodiments set forth will be readily apparent to those skilled in the art. Such modifications will be understood not to depart from the spirit and scope of the invention as set forth in the following claims.

We claim:

1. A method for making a filled thermoplastic pitch composition comprising the steps of:
   (a) combining a particulate filler with a pitch and heating to provide a filled pitch mixture;
   (b) heating said filled pitch mixture to polymerize and advance said pitch to a TMA deformation temperature of at least 400° C.

2. The method of claim 1 further comprising the step of shaping and densifying said filled thermoplastic pitch composition by applying pressure at a temperature above said TMA deformation temperature to provide a thermoplastic composition having a density in the range of from 1.1 to about 1.8 g/cm$^3$.

3. The method of claim 2 wherein the bulk density of the pitch component is in the range of from 1.15 to about 1.3.

4. The method of claim 2 wherein the bulk density of the pitch component is about 1.3.

5. The method of claim 1 wherein steps (a) and (b) are conducted in an inert environment.

6. A method for producing a filled thermoplastic pitch preform comprising the steps of:
   (a) combining a particulate filler with pitch and heating to render the pitch component molten;
   (b) polymerizing and advancing the pitch component to a TMA deformation temperature of at least 400° C.;
   (c) applying mechanical pressure to the filled pitch at a temperature above the TMA deformation temperature to increase the density to value of from 1.1 to about 1.8 g/cm$^3$.

7. The method of claim 6 wherein the particulate filler is selected from pulverized coke, coke flour and powdered graphite.

8. The method of claim 6 wherein steps (a), (b) and (c) are conducted in an inert environment.

9. A carbon-carbon composite made by the steps of:
   (a) combining a particulate filler and a pitch and heating to render the pitch molten;
   (b) heating the filled pitch to polymerize and advance the pitch component to a TMA deformation temperature of at least 400° C.;
   (c) applying mechanical pressure at the surfaces of the filled thermoplastic pitch to shape and densify the advanced filled thermoplastic pitch to form a thermoplastic preform having a density of 1.1 to about 1.8 g/cm$^3$;
   (d) coking the said preform to form a non-deformable thermoset structure;
   (e) carbonizing the thermoset structure.

* * * * *